March 16, 1943.    G. S. MIKHALAPOV    2,314,099
SPOT WELDING MACHINE
Filed May 1, 1941    9 Sheets-Sheet 5

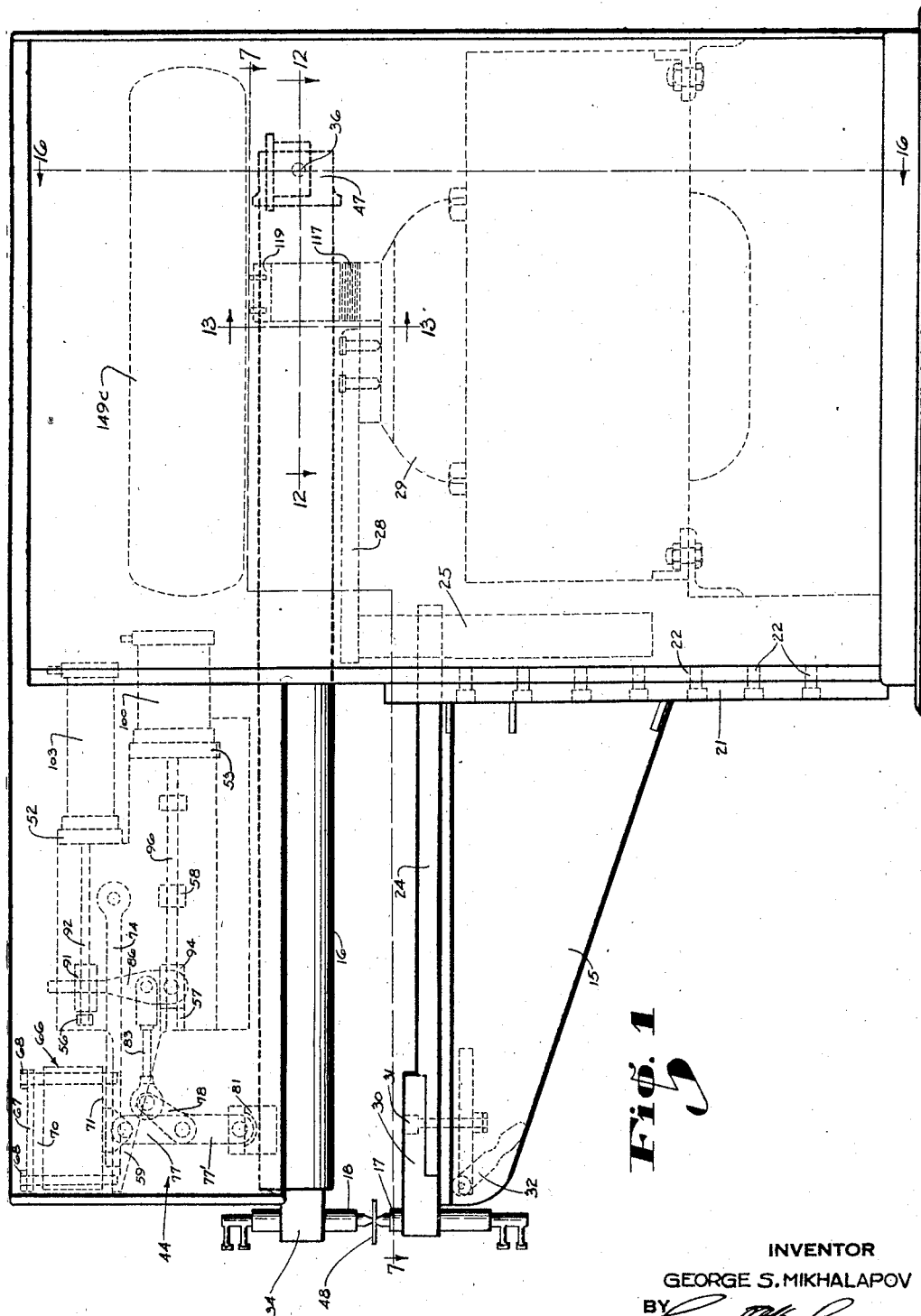

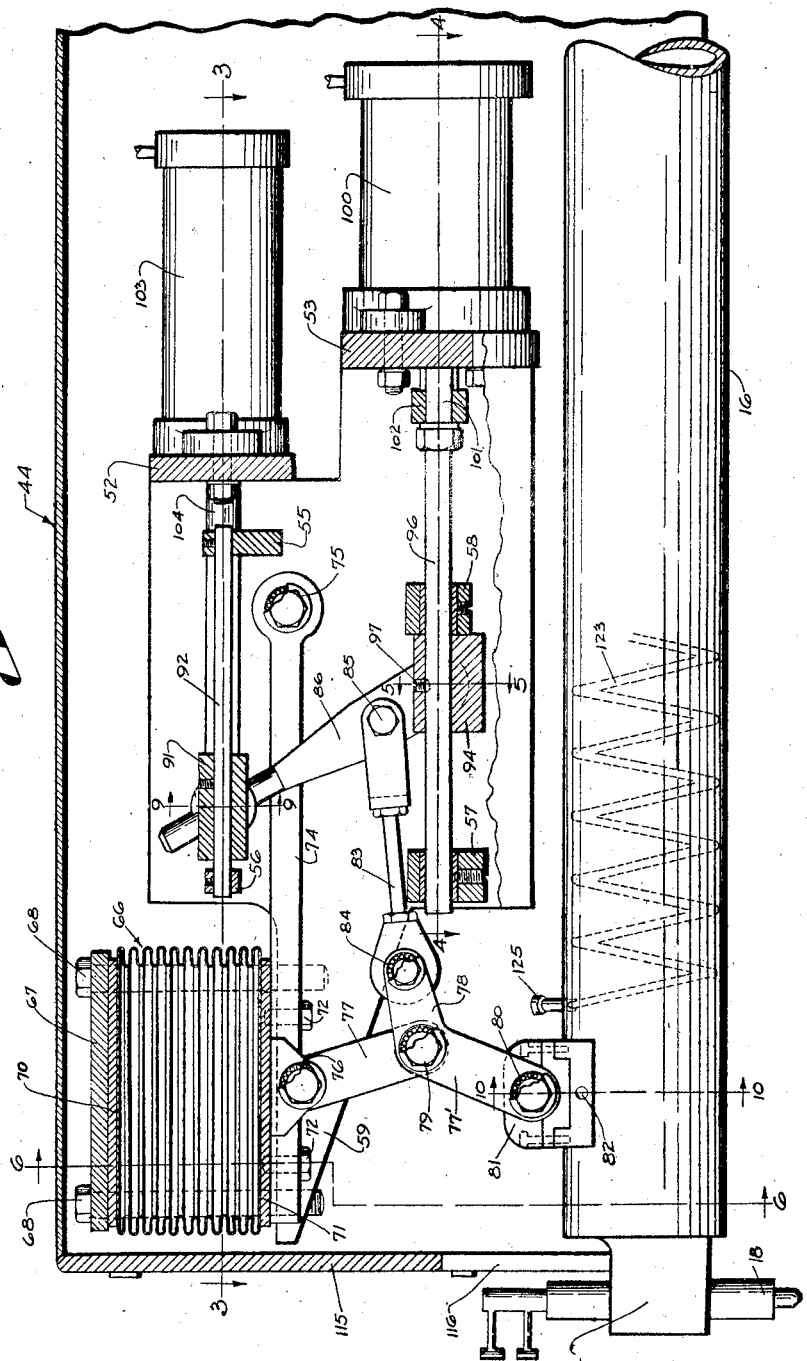

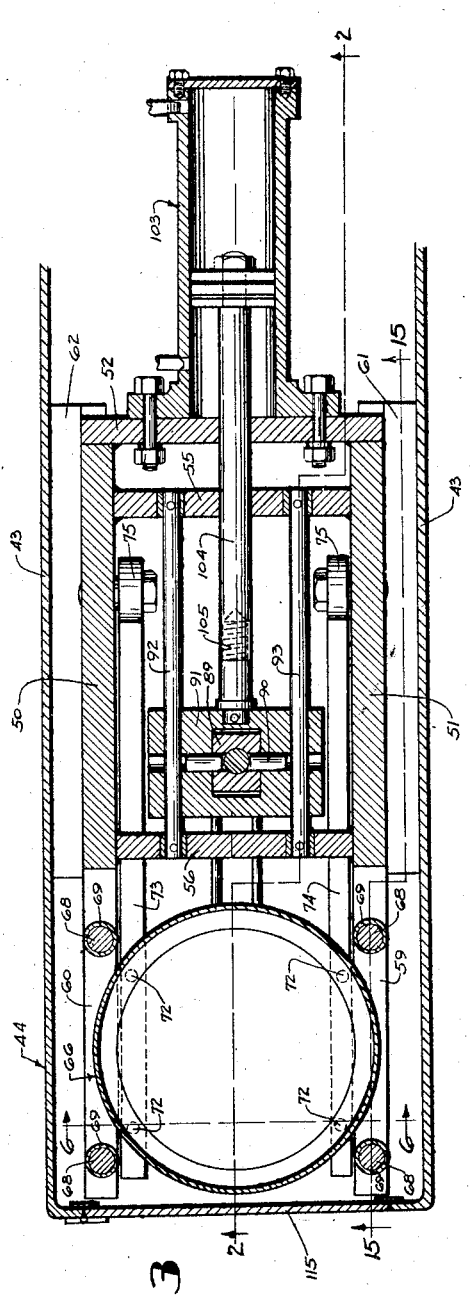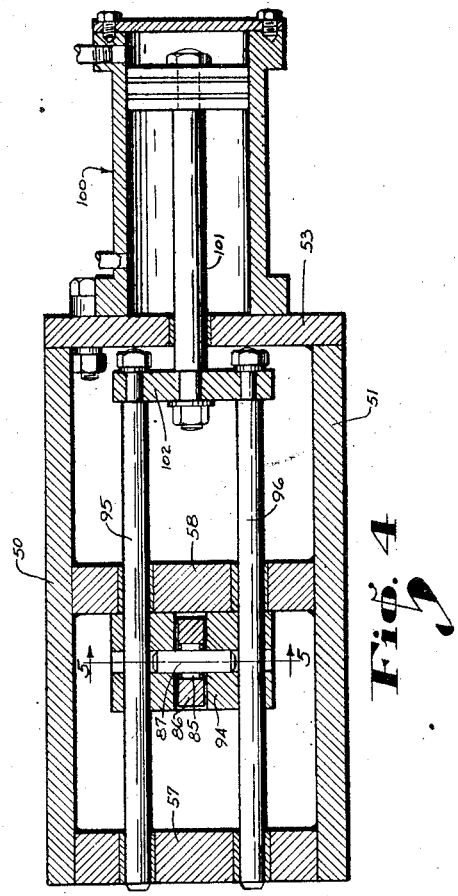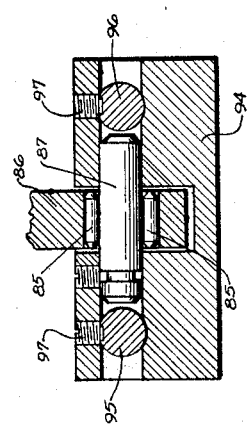

INVENTOR
GEORGE S. MIKHALAPOV
BY

March 16, 1943. G. S. MIKHALAPOV 2,314,099
SPOT WELDING MACHINE
Filed May 1, 1941 9 Sheets-Sheet 6
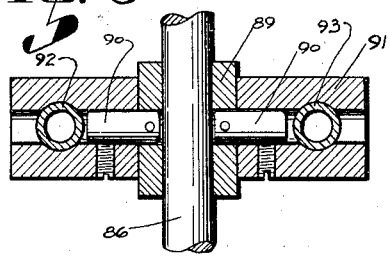
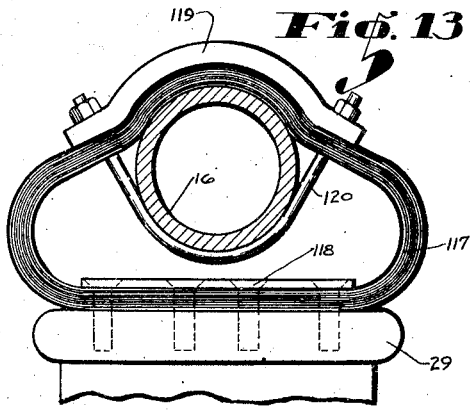
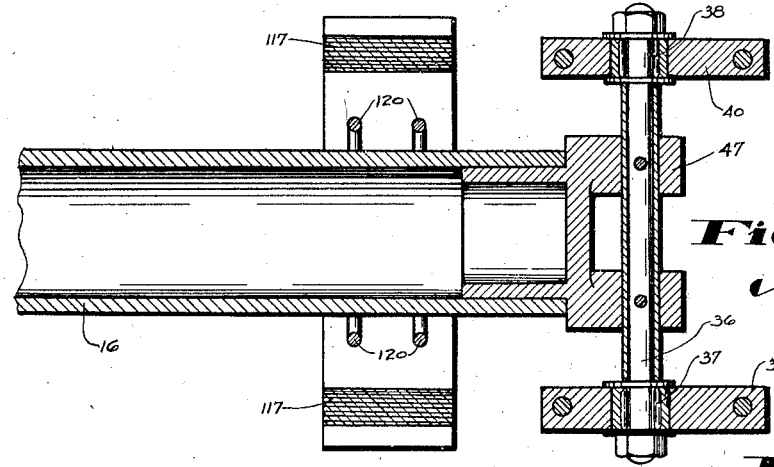
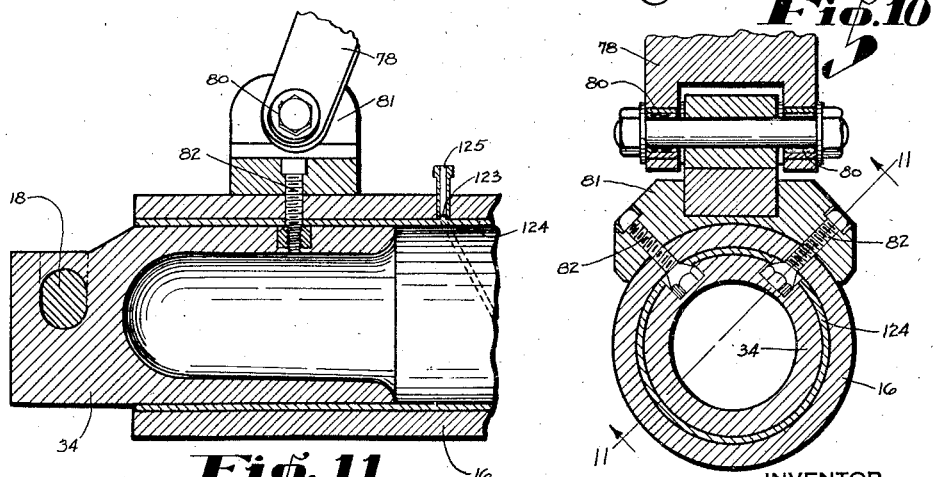
INVENTOR
GEORGE S. MIKHALAPOV

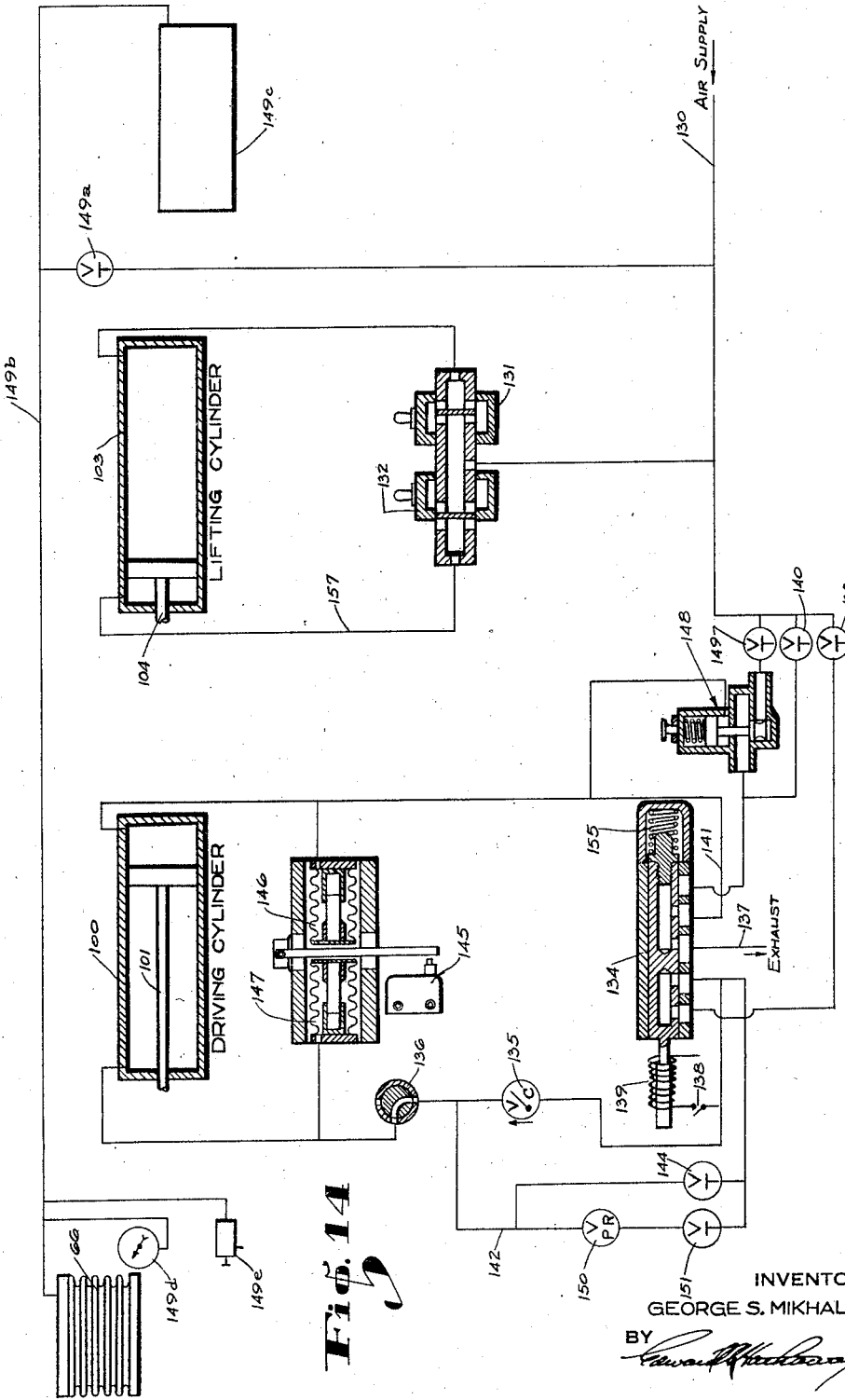

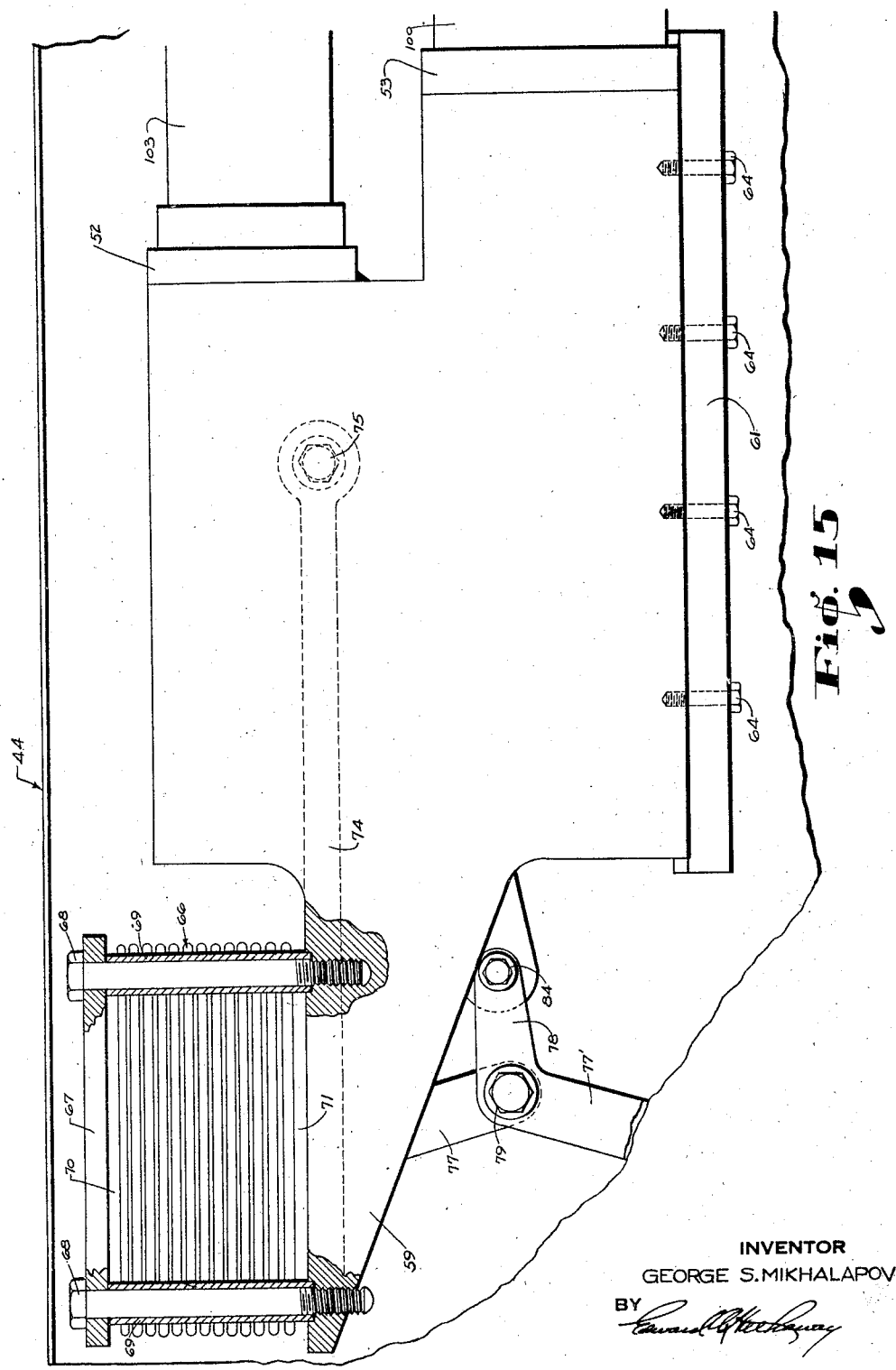

INVENTOR
GEORGE S. MIKHALAPOV

Patented Mar. 16, 1943

2,314,099

UNITED STATES PATENT OFFICE 2,314,099

SPOT WELDING MACHINE

George S. Mikhalapov, Village of Hunting Valley, Ohio, assignor to The Baldwin Locomotive Works, a corporation of Pennsylvania Application May 1, 1941, Serial No. 391,244

10 Claims. (Cl. 219—4)

This invention relates generally to welding apparatus and more particularly to spot welding.

Various machines have heretofore been proposed and used for spot welding various materials, but such machines have been deficient in certain respects especially when used for welding sheet aluminum or its alloys. The difficulties in welding sheet aluminum arise from the fact that aluminum has an extremely short plastic range with transition between solid and liquid state occurring at a temperature change of but a few degrees, and therefore, almost instantaneously. As a definite expansion occurs during the fusing period, as is evidenced by expulsion of molten metal from between the sheets when this expansion is insufficiently checked, the sudden solidification occurring at an extremely high rate results in a tendency of the metal to contract and to draw away from the electrode points, and thus to solidify without any external pressure applied on the metal undergoing solidification. The solidification of aluminum or aluminum alloy without external pressure applied to it, results in a porous casting, and in addition, is accompanied by shrinkage cracks, due to the restraining effect of the surrounding cold metal, and the stiffness of the metal sheet which prevents the solidifying mass from compensating for the lack of necessary contraction in the horizontal, or sheet plane, by contraction in the vertical, or right angle plane. It is also well known to those skilled in the art, that if, on the other hand, the solidifying mass is subjected to continual high pressure in the vertical plane, porosity, or formation of gas pockets is entirely avoided, and in addition, the compression in the vertical field compensates for the lack of contraction in the horizontal plane, and avoids formation of shrinkage cracks. It will be thus seen that the drawing away of the molten mass from the electrode points, and the resulting solidification without external pressure is a condition which cannot be tolerated. However, in the prior art equipment intended for welding aluminum, the friction and inertia of the welding electrodes and parts rigidly attached to those electrodes was so high that the electrodes were unable to follow the extremely high rate of contraction and solidification and they, therefore, usually occurred either with no pressure, or very little external pressure on the mass undergoing the solidification.

In addition to the defective weld structure, the comparatively poor contact between the electrodes and the surface of the metal covering the solidifying weld mass results in increasing the electrical resistance between the electrode surface and the metal surface, which in turn results in improper cooling of the surface and in local amalgamation of the electrode metal with the aluminum sheet metal, which is known to those skilled in the art as electrode pick-up. This electrode pick-up soon renders electrodes inoperative and requires frequent electrode dressing and cleaning with resulting loss of time.

However, if the electrodes are able to maintain contact with the metal surfaces surrounding the weld mass, a proper degree of pressure is then exerted on the weld mass, resulting in the formation of a proper weld structure, and in addition, the electrode and sheet aluminum surfaces will remain at temperatures where pick-up cannot take place, and thus eliminate the need for constant electrode cleaning.

It is an object of my invention to provide a spot welding machine that will maintain in an improved manner a desired pressure on the welding tips of the electrodes throughout the welding operation. A further object is to provide improved means in a spot welding machine whereby initial and follow-up pressures may be applied on the electrode tips with a high degree of sensitivity and responsiveness thereby being conducive to consistent uniformity for successive welds.

Another object is to provide improved means for supporting and operating the movable one of the electrodes so that it may be rapidly and conveniently brought into initial contact with the work piece under a predetermined pressure with minimum effort and time on the part of the operator. A further object in this respect is to provide improved operating and controlling mechanism that is relatively simple and economical in manufacture, operation and maintenance and that is rugged, compact and accessible combined with a high degree of sensitivity and responsiveness.

Another object is to provide improved means for supporting the movable electrode so as to reduce to a minimum friction and inertia thereby allowing the movable electrode to have a substantially instantaneous follow-up action when the material suddenly contracts upon solidification following the fusing period. Still another object is to provide an improved spot welding machine in which the electrodes may be easily and quickly separated after a weld is made and if desired to further separate the electrodes to permit a work piece with obstructions to be inserted between the electrodes.

A further object is to provide an improved spot welding machine whereby a work piece of substantial length and of widely varying diameters or sizes may be inserted between the electrodes without in any way interfering or reducing the effectiveness of my improved pressure applying means even though the work piece should be of such a character as to tend to twist or otherwise distort the electrodes from their proper relation to each other when pressure is applied.

Other objects and advantages will be more apparent to those skilled in the art from the following description of the accompanying drawings in which:

Fig. 1 is a side elevation of my improved spot welding machine showing certain parts in dotted outline but omitting other parts for sake of clarity;

Fig. 2 is an enlarged longitudinal vertical section taken substantially on the line 2—2 of Fig. 3;

Fig. 3 is a horizontal section taken substantially on the line 3—3 of Fig. 2;

Fig. 4 is a horizontal section taken substantially on the line 4—4 of Fig. 2;

Fig. 5 is a transverse section taken substantially on the lines 5—5 of Figs. 2 and 4;

Fig. 9 is a transverse section taken on the line 9—9 of Fig. 2;

Fig. 10 is a transverse section taken on the line 10—10 of Fig. 2;

Fig. 11 is a section taken on the line 11—11 of Fig. 10;

Fig. 12 is a horizontal section taken substantially on the line 12—12 of Fig. 1;

Fig. 13 is a transverse section taken substantially on the line 13—13 of Fig. 1;

Fig. 14 is a diagrammatic outline of the piping and control elements for operating the machine;

Fig. 15 is a side elevation of the Sylphon bellows and the toggle link supporting frame taken substantially on the line 15—15 of Fig. 3, the bellows being shown in full lines for purposes of simplicity;

Figures 7, 8:
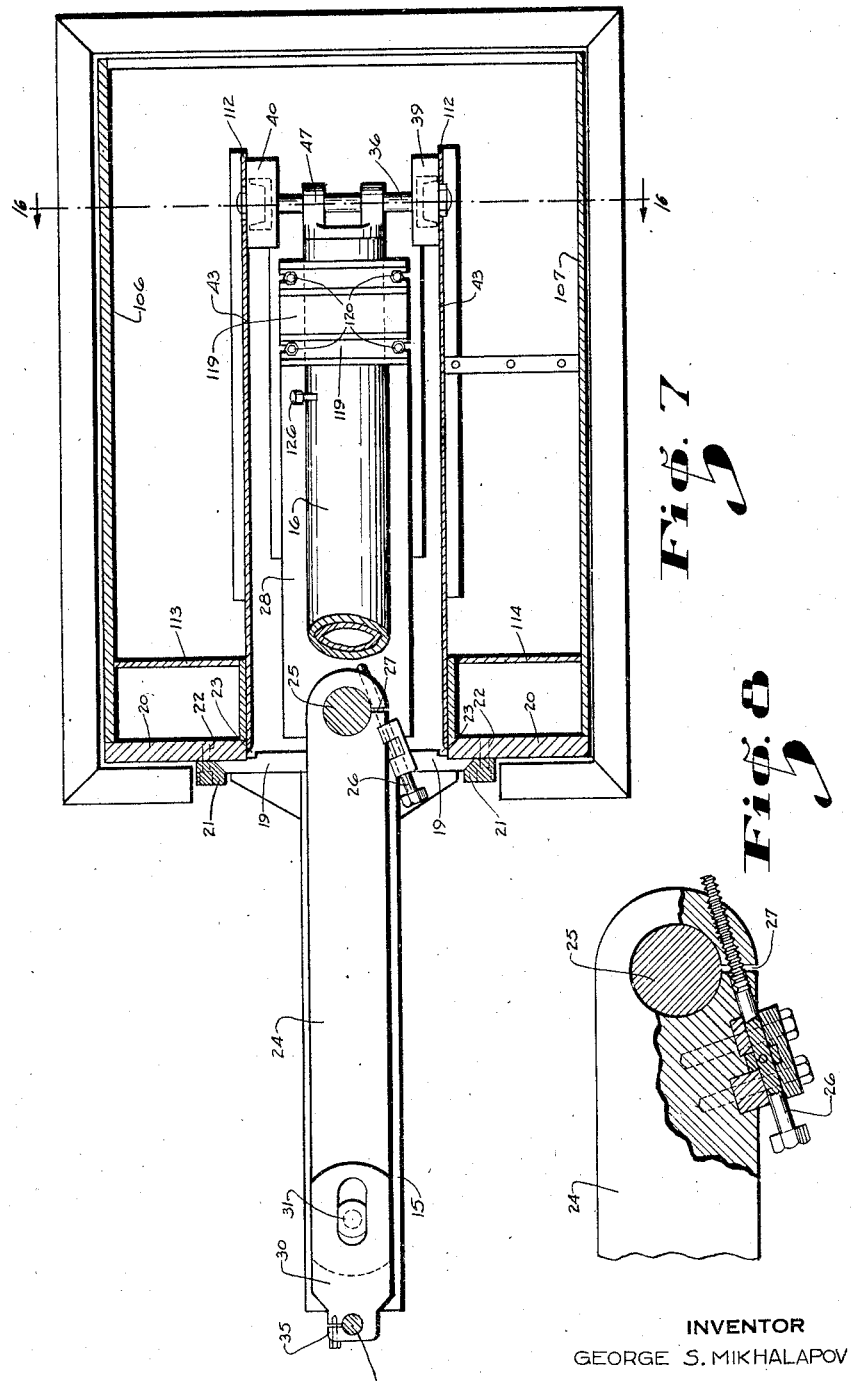
Fig. 7 is a horizontal section taken substantially on the line 7—7 of Fig. 1.
Fig. 8 is an enlarged horizontal section of the inner end of the conductor arm for one of the electrodes.

In the particular embodiment of the invention illustrated herein, I have shown a lower normally stationary arm 15 and an upper movable arm 16 respectively supporting a pair of opposed electrodes 17 and 18. The lower arm 15 is provided, as shown in Fig. 7, with lateral flanges 19 bearing against the vertical surface of a front wall 20 of a cabinet frame to be described later. The flanges 19 are held in position by gibs 21 suitably bolted as at 22 to the frame member 20 which is also provided with a vertically slotted portion 23 extending substantially for the full height of gibs 21. An electrode conductor in the form of a wide flat bar 24 rests upon arm 15 and is adapted to be releasably secured to a vertical bus bar post 25, Fig. 1, by a clamping screw 26, Figs. 7 and 8, the inner end of the conductor 24 being split as at 27 to permit said clamping action. The screw 26 is loosened to permit conductor 24 to ride up and down with arm 15 during vertical adjustment thereof, it being understood that the conductor post 25 is suitably rigidly held in position by an arm 28 which is secured to a transformer 29, Fig. 1. The conductor 24 has an outer adjustable end 30, Fig. 1, pivotally connected by a bolt 31 to the main portion of arm 24, the bolt 31 also extending through a part of arm 15 so as to releasably clamp the arm portions 24 and 30 thereto.

Figure 16:
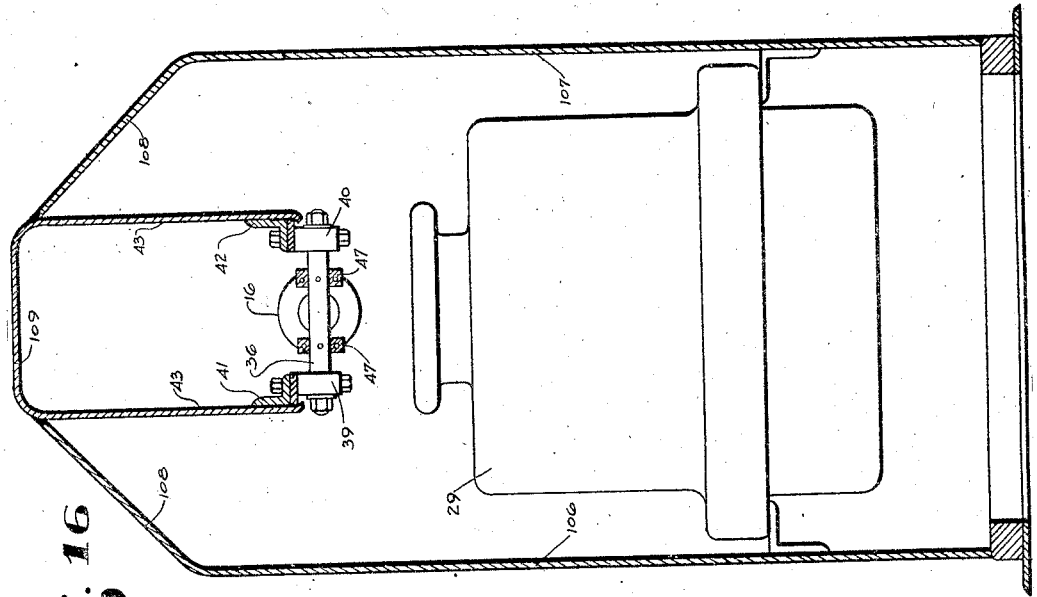
Fig. 16 is a transverse section taken substantially on the line 16—16 of Figs. 1 and 7.
Figure 17:
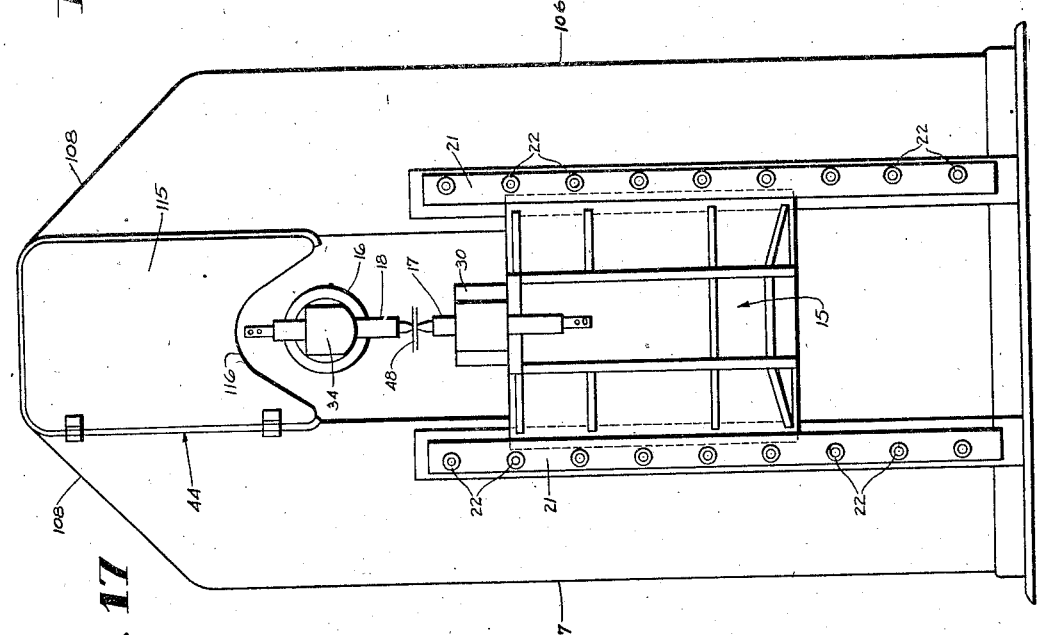
Fig. 17 is a front elevation of the machine.

One of the novel features of my invention is the provision of the upper pivotally movable arm 16 which is preferably an aluminum tube of relatively large diameter to resist torsion and yet be light enough to minimize inertia effects. The outer end of the tube is closed by a head 34, Fig. 11, in which the electrode 18 is vertically adjustable and adapted to be suitably clamped in the same manner as the lower electrode 17 is clamped at 35, Fig. 7. The inner end of arm 16, as shown in Fig. 1, is pivotally supported on a shaft 36, Figs. 1, 7 and 12. As shown in Figs. 1 and 12, the shaft 36 is preferably journalled in anti-friction bearings such as roller or ball bearings 37 and 38 supported in bearing brackets 39 and 40 which, as shown in Fig. 16, are supported on horizontal angle irons 41 and 42. These angle irons are secured to an inner frame 43 which forms a continuation of a horn casing generally indicated at 44, Fig. 1, to be described later. The long distance from pivot shaft 36, Fig. 1, to electrode 18 insures minimum static or dynamic frictional resistance to any large or small increment of movement of the electrode thereby permitting the electrode 18 to move substantially vertically with maximum freedom and ease combined with great torsional rigidity by reason of the arm 16 being a relatively large tube supported by widely spaced bearings. The connection of the tubular arm to shaft 36 may be through any suitable bracket 47, Fig. 12.

To establish a predetermined, preferably uniform, pressure upon the electrodes together with the ability to maintain and follow-up with this pressure on the sheet metal 48, Fig. 1, substantially instantaneously as the metal collapses upon reaching its fusible state, I have provided an electrode operating mechanism including a sub-frame having two transversely spaced vertical side plates 50 and 51 connected at their rear end, Fig. 15, by offset transverse plates 52 and 53 welded or otherwise suitably secured to the side plates 50 and 51. Intermediate groups of cross supports 55, 56, 57 and 58 are shown in Figs. 2, 3 and 4 suitably welded to the inside surface of the side plates 50 and 51. As shown in Fig. 15, the side plates have forwardly projecting tapered arms 59 and 60, Fig. 3. This sub-frame is supported upon an intermediate portion of the horn frame 44, Fig. 6, through a pair of longitudinal strips 61 and 62 bolted or otherwise suitably secured to the inner surface of the vertical sides 43 of the horn frame. The lower edges of the side frames 50 and 51 rest upon the ledges 61 and 62 and are suitably bolted thereto by a series of bolts 64. A yieldable means specifically in the form of a metal air bellows 66, Fig. 2, is rigidly supported at its upper end against an inverted base plate 67 which is bolted at its outer corners to the tapered frame projections 59 and 60 by a series of bolts 68, the inverted base 67 being held in spaced relation to the arms 59 and 60 by sleeves 69, Fig. 15. The upper end plate 70 of the bellows, Figs. 2 and 6, may be screwed or otherwise suitably secured to plate 67. The lower end of the bellows is vertically movable specifically by the provision of a lower end plate 71 secured as by bolts 72, Fig. 6, to a pair of movable arms 73 and 74, these arms being pivotally connected preferably through anti-friction bearings such as roller or ball bearings 75 to the inner sides of the sub-frame sides 50 and 51, Figs. 2 and 3. The lower end plate 71 is pivotally connected preferably through anti-friction bearings 76 to a pair of spaced toggle links 77, these links in turn being connected to a bell crank 78 through an anti-friction pivot bearing 79 while the lower end of the bell crank is connected through an anti-friction bearing pivot 80 to a suitable bracket 81 which is bolted as at 82, Fig. 10, to the tubular electrode arm 16. The crank end of arm 78 is pivotally connected through a roller bearing 84 to a link 83 which is pivotally connected as at 85 to a lever 86. The lower end of lever 86 is pivotally supported preferably through a roller bearing on a pin 87, Fig. 5, while the upper end of lever 86 is preferably cylindrical and slidably extends through a pivot block 89, Fig. 9. This block is pivotally supported upon pins 90 in a horizontally reciprocable fulcrum block 91 which slides on a pair of stationary horizontal rods 92 and 93, Fig. 3, fixed in the cross braces 55 and 56. Similarly, the lower fulcrum pin 87 of lever 86 is mounted in a fulcrum block 94 rigidly secured by set screws 97, Fig. 2, to a pair of horizontally movable rods 95 and 96, Fig. 4, so as to be movable therewith. These rods 95 and 96 are slidably supported in the cross bars 57 and 58. The lower fulcrum block raises and lowers the movable electrode through its normal welding range while the upper fulcrum block lifts the electrode above its normal open position to allow a large work piece or obstruction thereon to be inserted.

The power driving means for longitudinally moving the lower fulcrum block 94 includes a piston and cylinder servo-motor generally indicated at 100, Fig. 4, whose piston rod 101 is connected to the movable rods 95 and 96 through a cross-piece 102. The upper fulcrum block 91 is actuated by a smaller lifting servo-motor generally indicated at 103, Fig. 3, whose piston rod 104 has an axially adjustable threaded connection 105 with a stub rod secured to block 91. The servo-motors 100 and 103 are preferably air operated, the lifting motor 103 being normally biased to and remaining in its left position, Fig. 3, so that block 91 is normally in the position shown in Fig. 2. The driving motor 100 is in its right hand position, Fig. 4, when the electrodes are normally separated.

The casing for my improved machine also constitutes the main frame thereof and includes, as shown in Fig. 16, relatively heavy sheet metal sides 106 and 107 having upper inclined sides 108 merging with and welded or otherwise suitably secured to the horn frame 44. This horn frame has an upper surface 109 and vertical sides 43, 43, the horn, as shown in Fig. 1, extending from the front (left) end of electrode arm 16 rearwardly to a point 112, Fig. 7, within the large supporting base portion of the casing 106, 107 and 108. As above mentioned, the inclined sides 108 are preferably welded to the horn frame at a point adjacent the top surface 109 thereof. To impart additional lateral stability to the horn frame there are provided transverse bracing plates 113 and 114, Fig. 7, interposed between the side walls 106, 107 and the horn side walls 43, 43. The forward end of the horn is preferably closed only by a door 115, Fig. 3, pivoted to swing about a vertical axis at one side thereby allowing access to the operating mechanism shown in Fig. 2. The door is suitably slotted as at 116 to permit additional lifting movement of the electrode arm when the lifting servo-motor 103 is moved rearwardly.

As shown in Fig. 1, the transformer 29 is located in the lower part of the main base casing and the electrical connection between this welding transformer and the pivotal electrode arm 16 comprises, as shown in Fig. 13, a series of thin flexible conductor strips closely spaced to each other to form a common flexible conductor 117 having a lower flat portion secured as at 118 to the leads of the transformer 29 and a curved upper portion extending over the top of arm 16 and held in contact therewith by a clamping strip 119 and a plurality of clamping rods 120. The relatively elongated flat shape of conductor 117, as shown in Fig. 13, permits arm 16 to have relatively free pivotal movement without any appreciable binding or restraining action from the conductor, this freedom of movement being further augmented by reason of the conductor being placed near the pivotal end of the arm where movement thereof is not only small but also the leverage action is greatest and hence minimum effort is required to move the arm.

If it should be desirable to water cool the arm 16 by reason of a heavy welding current flowing therethrough, the internal surface of the arm may be provided with a spiral groove generally indicated at 123, Figs. 2 and 11. A sleeve 124, Fig. 11, may be inserted within the tube in close fitting contact with the interior thereof whereby a cooling medium, such as water admitted through an inlet pipe 125, will flow through the spiral groove 123 and finally discharge through a pipe 126, Fig. 7. Suitable flexible hose (not shown) is connected to the inlet and outlet pipes.

The system for controlling operation of the servo-motors 110 and 103 will be more readily understood from a description of the machine as a whole.

*Operation.*—With the machine normally at rest the movable electrode and its arm are in a partially raised position and the toggle mechanism and servo-motors are in the position shown in Fig. 2. During this time fluid pressure is admitted from a supply pipe 130, Fig. 14, through valve 131 to hold the lifting servo-motor 103 in its left hand position while the other end of this servo-motor is exhausted through valve 132. Fluid pressure is also supplied from pipe 130 through a throttle valve 133, a valve 134, a check valve 135 and a manually operable valve 136 to hold the driving servo-motor 100 in its retracted position, the other end of this motor being exhausted to atmosphere through the exhaust pipe 137. To bring the electrodes together the operator closes a switch 138 thereby energizing a solenoid 139 to shift valve 134 to the right against a spring whereupon fluid pressure is supplied through a throttle valve 140 to valve 134 and thence through a pipe 141 to the right or driving end of servo-motor 100. The fluid pressure on the retracting side of servo-motor 100 exhausts through a pipe 142 and through a throttle valve 144 and valve 134 to exhaust. With the throttle valve 144 open to full flow and throttle 140 throttled to any desired rate of flow the retraction side of the driving cylinder is exhausted immediately and pressure gradually builds up in the driving side whereby the piston moves fulcrum block 94, Fig. 2, forwardly (to the left)

and accordingly tends to straighten toggle links 77 and 77' thereby lowering the pivoted arm 16 and its electrode 18 until the work piece is engaged. As the driving pressure increases a pilot valve 148 will open at a predetermined adjustable pressure thereby admitting full pressure to the driving side through a throttle valve 149 and valve 134 to pipe 141. This increased pressure will straighten the toggle links 77 and 77' and simultaneously compress the constant pressure bellows 66 as by moving the lower bellows plate 71 upwardly and thereby limiting the pressure on the electrodes. By reason of the bellows 66 having no frictional resistance, it is seen that when the sheet metal work piece suddenly contracts upon solidification of the metal following the fusing period, the constant air pressure in the bellows will cause the movable toggle mechanism and welding arm together with the electrode to exert a continuous uniform follow-up pressure. The bellows is supplied with fluid pressure through a throttle valve 149a and pipe 149b which are connected to a tank 149c, a pressure gauge 149d and an adjustable bleeder valve 149e.

Fluid pressure gradually increases in the driving side until a differential pressure switch 145 is operated. This differential pressure mechanism includes two small opposed bellows 146 and 147 connected respectively to the driving and retraction sides of the driving cylinder. When a predetermined differential pressure exists the switch 145 is operated so as to establish a welding current through the electrodes.

On the other hand, if throttle valve 144 is either partially throttled or closed and valve 140 is open to full flow, then the pressure will gradually decrease in the retraction side of servomotor 100 because the air will now exhaust through an adjustable pressure relief valve 150 and a throttle valve 151. In this case the pressure on the driving side of the driving cylinder will rise immediately to full line pressure but as the pressure decreases in the retraction side the piston moves the toggle links to bring the electrode tips together and gradually apply a force between them. At a predetermined pressure differential the switch 145 initiates the welding current through the electrodes. With a further decrease in pressure in the retraction side the toggle links are straightened so as to lift the bellows thereby establishing a predetermined constant pressure on the electrode. The differential switch action for initiating the welding current may be adjusted so as to occur just previously to, simultaneously with, or just after the application of the bellows pressure.

Figure 6:
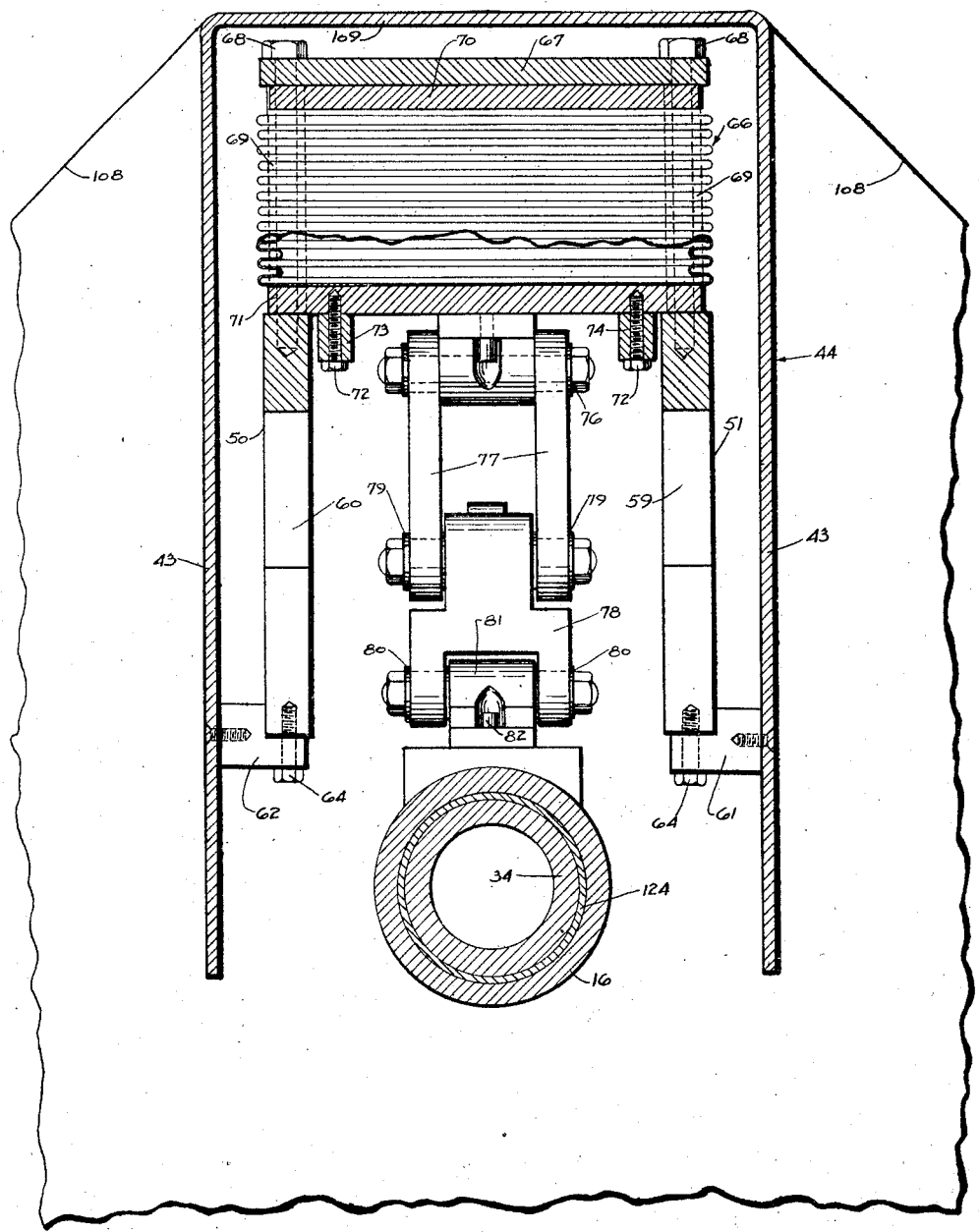
Fig. 6 is a section taken substantially on the line 6—6 of Figs. 2 and 3.

Upon completion of the welding operation the operator opens switch 138 whereupon a spring 155 moves valve 134 to the left thereby exhausting the driving side of the driving cylinder 100 through pipes 141 and 137 and admitting fluid pressure from supply pipe 130 through valves 133, 134, 135 and 136, it being understood the that throttle valve 133, as well as all other throttle valves disclosed, is adjustable to control the rate of air flow. Upon retraction of the driving motor the pivot block 94, Fig. 2, is moved rearwardly to swing lever 86 about its temporarily fixed pivot in fulcrum block 91 thereby breaking the toggle links and lifting the electrode arm 16. When the toggle links are broken the end plate 71 of bellows 66 will rest upon the side plates 50 and 51 of the operating sub-assembly frame as shown in Fig. 6. The bellows pivot 76 and the bellows itself are maintained in a stable condition by pivotal arms 73 and 74 which allow complete freedom of action of the bellows during operation of the toggle links.

To allow the upper movable electrode and its pivotal supporting arm 16 to be lowered under their own weight, valve 136, Fig. 14, is rotated 90° in a clockwise direction to connect the retraction side of the driving cylinder to exhaust. When the arm 16 drops, then the toggle links are in a substantially straightened position which is substantially similar to the welding position of the arm but it is not rigidly held in this position by power from the servo-motor and hence the operator can conveniently and easily make any necessary or desired adjustments of the electrodes or operating elements. The normal lifted position of the pivoted arm 16 may be readily re-established merely by turning valve 136 to its position shown in Fig. 14.

If it is desired to lift the arm 16 above its normal lifted position, then valves 131 and 132 are shifted so as to exhaust the right end of lifting cylinder 103, Fig. 14, and admit fluid pressure from supply pipe 130 through valve 132 and pipe 157 to the retracting end (left) of cylinder 103. This causes the piston of lifting servo-motor 103 to move to the right and similarly move fulcrum block 91, Fig. 2, so as to swing lever 86 in a clockwise direction about its lower pivot in fulcrum block 84 which is now in its retracted position as shown in Fig. 2. Said clockwise movement accordingly pulls on link 83 and the toggle links connected thereto to further collapse the latter and thereby lift the electrode arm 16. During this lifting operation the upper toggle link pivot 76 cannot drop inasmuch as the bellows plate 71 rests upon the sub-assembly side frames 50 and 51 as shown in Fig. 6. This extra lifting movement above the normal lifted position is useful for various purposes among which is the ability to allow various obstructions on a work piece to pass by the electrodes when being inserted between the same. The electrode arm may be very quickly restored to its normal lifted position merely by shifting valves 131 and 132 to the full line positions shown in Fig. 14.

From the foregoing disclosure, it is seen that I have provided a very sturdy, compact and yet conveniently operable spot welding machine that has a high degree of flexibility and uniformity of operation, as well as insuring an instantaneous follow-up pressure on the electrodes during contraction of the metal following its fusible state, these desirable features of operation being accomplished with a minimum of time, effort and thought on the part of the operator and also being obtained with ease and simplicity of operation that is highly conducive to rapid mass production work while consistently maintaining high quality uniform welding. In accomplishing certain of these desirable results I have reduced frictional resistance and inertia forces to a minimum thereby allowing the above mentioned instantaneous follow-up action and this is accomplished under a constant electrode applying pressure whose value remains uniform regardless of the extent of normal movement of the electrode. The arrangement and construction of the various elements and of the combined frame and casing structure are such as to be conducive to maximum compactness and sturdiness combined with the ability to weld large work pieces with ease and dispatch.

It will of course be understood that various changes in details of construction and arrangement of parts may be made by those skilled in the art without departing from the spirit of the invention as set forth in the appended claims.

I claim:

1. A spot welding machine comprising, in combination, a pair of opposed electrodes, an elongated member for movably supporting one of said electrodes at one end, means for pivotally supporting said elongated member at its other end, power operated toggle mechanism for moving said elongated member into and out of a welding position, and means acting upon said toggle mechanism to impart additional movement to said elongated member away from its welding position.

2. A spot welding machine comprising, in combination, a pair of opposed electrodes, means for moving one of the same including a toggle mechanism, a lever connected to said toggle mechanism, power means for moving one end of said lever for effecting normal movements of the movable electrode to and from a work piece, and means for moving the other end of said lever to effect additional movement of the movable electrode away from the work piece.

3. A spot welding machine comprising, in combination, a pair of opposed electrodes, an elongated member pivotally supported at one end and having one of said electrodes supported at the other end, and a curved flexible electrical member extending transversely of said elongated member and connected thereto at a point adjacent said pivotal end so as to flex in a direction crosswise of said elongated member upon pivotal movement thereof whereby the electrical connection has a relatively small amount of movement during a larger movement of the movable electrode.

4. A spot welding machine comprising, in combination, a pair of opposed electrodes, power means for normally moving one of said electrodes to and retracting it from its welding position with respect to the other electrode, means for rendering the normal retracting force of said power means ineffective during movement of the movable electrode to its welding position, and means for imparting retracting movement to said movable electrode in addition to the retraction by said power means when the retraction operation is rendered operative.

5. A spot welding machine comprising, in combination, a pair of opposed electrodes, power means for normally moving one of said electrodes toward or away from the other of said electrodes, yieldable constant pressure means against which said movable electrode reacts when exerting a welding pressure, and additional power means for also moving said movable electrode away from the other electrode so as to supplement said normal movement.

6. A spot welding machine comprising, in combination, a pair of opposed electrodes, a pair of fluid operated servo-motors each having a piston and cylinder, means whereby one of said servo-motors is operative to effect a limited movement of one of said electrodes to or retraction from its normal operative welding position, and means operated by the second servo-motor for imparting further retractive movement to the movable electrode in addition to its normal retractive movement.

7. A spot welding machine comprising, in combination, a pair of opposed electrodes, mechanism for moving one of the same to and from its operative position with respect to the other electrode, yieldable constant pressure means against which said mechanism reacts when said movable electrode is in its operative position, and means for supporting the yieldable portion of said constant pressure means including an elongated arm one end of which is journalled about a fixed pivot and the other end of which is connected to said constant pressure means and to said means for moving the movable electrode.

8. A spot welding machine comprising, in combination, a main frame having side walls, means for supporting a normally stationary electrode at one end of said side walls, a horn frame disposed between and supported by said side walls and extending from within said main frame and projecting outwardly beyond the end thereof at the end where said stationary electrode is positioned, an elongated arm having an electrode at one end for cooperation with said stationary electrode and extending back into said main frame, and means for pivotally supporting said arm by said horn frame at a point within said main frame.

9. The combination set forth in claim 8 further characterized in that said main frame consists of plate metal sides and top, and said horn frame also consists of plate metal side and top portions with the top portion comprising a part of the top of the main frame, whereby said side portions on said horn frame depend freely downwardly into the interior of said main frame in spaced relation to the walls thereof and also project longitudinally out through one end of said main frame.

10. The combination set forth in claim 8 further characterized in that said main frame consists of plate metal sides and top, and said horn frame also consists of plate metal side and top portions with the top portion comprising a part of the top of the main frame, whereby said side portions on said horn frame depend freely downwardly into the interior of said main frame in spaced relation to the walls thereof and also project longitudinally out through one end of said main frame, and power operated means disposed within and supported by said horn frame for moving said pivotally supported elongated arm.

GEORGE S. MIKHALAPOV.